US009485197B2

(12) United States Patent
Dutta et al.

(10) Patent No.: US 9,485,197 B2
(45) Date of Patent: Nov. 1, 2016

(54) TASK SCHEDULING USING VIRTUAL CLUSTERS

(71) Applicant: Cisco Technology, Inc., San Jose, CA (US)

(72) Inventors: Debojyoti Dutta, Santa Clara, CA (US); Madhav Marathe, Cupertino, CA (US); Senhua Huang, Fremont, CA (US); Raghunath Nambiar, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 323 days.

(21) Appl. No.: 14/156,169

(22) Filed: Jan. 15, 2014

(65) Prior Publication Data

US 2015/0200867 A1 Jul. 16, 2015

(51) Int. Cl.
*H04L 12/935* (2013.01)
*H04L 12/24* (2006.01)

(52) U.S. Cl.
CPC ....... *H04L 49/3045* (2013.01); *H04L 41/0896* (2013.01)

(58) Field of Classification Search
CPC ........... H04L 41/0896; H04L 49/3045; H04L 47/70; H04L 47/10
See application file for complete search history.

(56) References Cited

U.S. PATENT DOCUMENTS

| 6,438,123 | B1 | 8/2002 | Chapman |
| 2005/0272438 | A1 | 12/2005 | Holur et al. |
| 2006/0218301 | A1 | 9/2006 | O'Toole et al. |
| 2006/0221972 | A1 | 10/2006 | Bhargava et al. |
| 2011/0078227 | A1* | 3/2011 | McAloon ............ G06F 11/3006 709/201 |
| 2012/0087377 | A1* | 4/2012 | Lai .......................... H04L 45/04 370/427 |
| 2012/0167101 | A1* | 6/2012 | Kandula ............... H04L 67/325 718/102 |
| 2013/0114480 | A1 | 5/2013 | Chapman et al. |
| 2013/0238785 | A1* | 9/2013 | Hawk ................... G06F 9/5072 709/224 |
| 2014/0006534 | A1* | 1/2014 | Jain ....................... G06F 9/5094 709/208 |
| 2014/0047084 | A1* | 2/2014 | Breternitz ........... H04L 67/1008 709/221 |

OTHER PUBLICATIONS

"Hadoop MapReduce Next Generation-2.2.0—Capacity Scheduler", Online Article, http://hadoop.apache.org/docs/stable/hadoop-yarn/hadoop-yarn-site/CapacityScheduler.html, Oct. 2013, 5 pages, The Apache Software Foundation, www.Apache.org.
Zaharia, et al., "Improving MapReduce Performance in Heterogeneous Environments", 8th USENIX Symposium on Operating Systems Design and Implementation, Dec. 2008, pp. 29-42, USENIX, Berkeley, CA.

\* cited by examiner

*Primary Examiner* — Chris Parry
*Assistant Examiner* — Stephen Houlihan
(74) *Attorney, Agent, or Firm* — Parker Ibrahim & Berg LLC; James M. Behmke; Stephen D. LeBarron (57) ABSTRACT

In one embodiment, a device receives information regarding a data set to be processed by a map-reduce process. The device generates a set of virtual clusters for the map-reduce process based on network bandwidths between nodes of the virtual clusters, each node of the virtual cluster corresponding to a resource device, and associates the data set with a map-reduce process task. The device then schedules the execution of the task by a node of the virtual clusters based on the network bandwidth between the node and a source node on which the data set resides.

16 Claims, 9 Drawing Sheets

TASK SCHEDULING USING VIRTUAL CLUSTERS

TECHNICAL FIELD

The present disclosure relates generally to cloud computing systems, and, more particularly, to task scheduling using virtual clusters.

BACKGROUND

Generally, the "cloud" refers to computing resources, such as software, services, and information, connected via a network, e.g., the Internet. "Cloud computing" can thus be defined as Internet-based computing in which these computing resources are dynamically provisioned and allocated to client or user computers or other devices on-demand from a pool of resources available via the cloud. Cloud computing is envisioned as a way to allocate access to these resources according to particular needs of a user. One application of cloud computing is to process multi-phase, distributed computing jobs. In these types of applications, the data is divided up and processed in parallel by multiple tasks during each execution phase, thereby reducing the total amount of time to complete the job.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device receives information regarding a data set to be processed by a map-reduce process. The device generates a set of virtual clusters for the map-reduce process based on network bandwidths between nodes of the virtual clusters, each node of the virtual cluster corresponding to a resource device, and associates the data set with a map-reduce process task. The device then schedules the execution of the task by a node of the virtual clusters based on the network bandwidth between the node and a source node on which the data set resides.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc.

Figure 1:
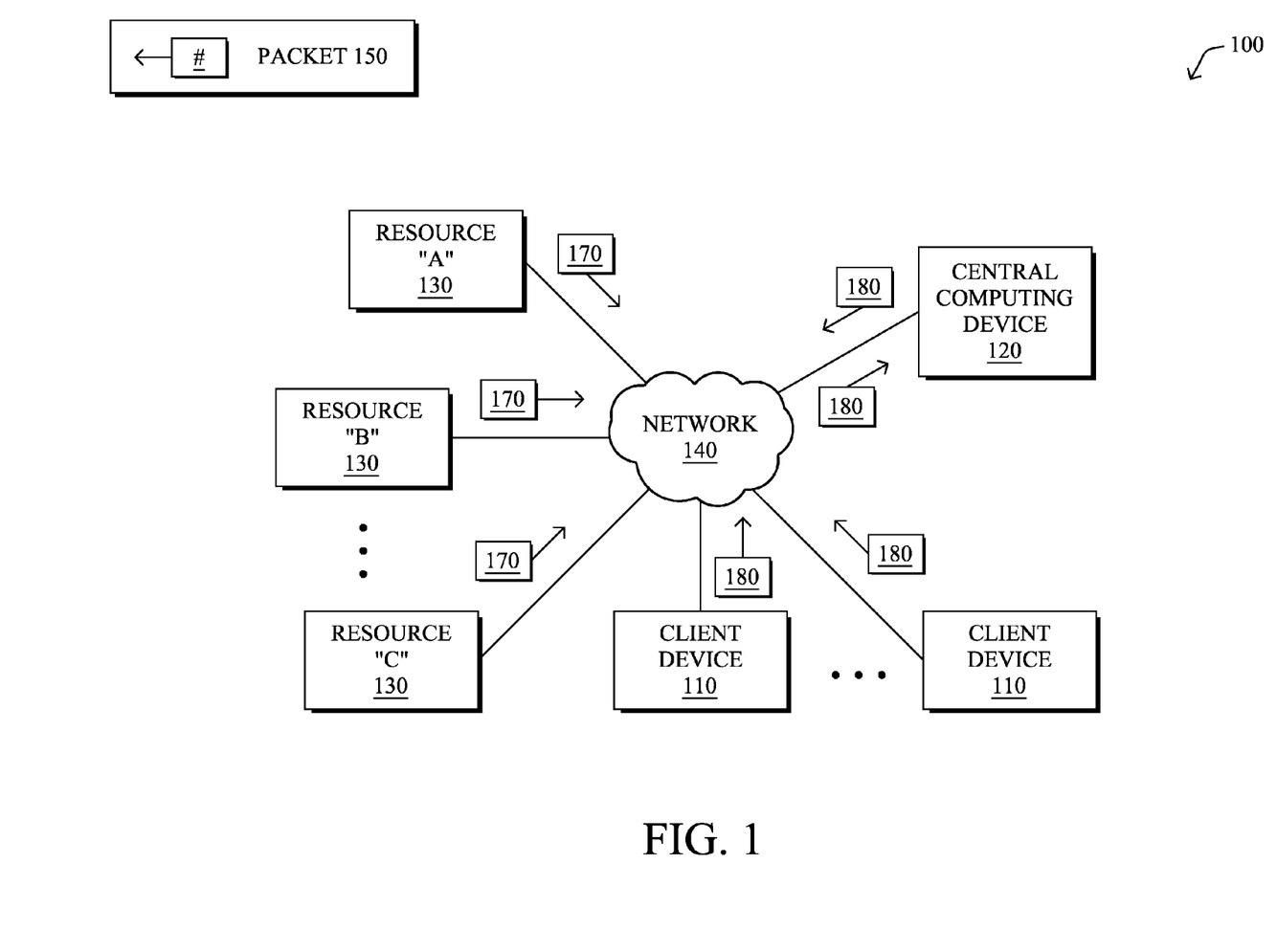
FIG. 1 illustrates an example communication network.

For example, FIG. 1 illustrates an example computer network 100 illustratively comprising a plurality of devices, such as a client device(s) 110, a centralized computing device (e.g., a server, a head-end application device, a network management server or "NMS," etc.) 120, and a plurality of other devices 130 (e.g., "A," "B," "C," etc.), generally referred to as "resources" herein. Generally, the client device 110, computing device 120, and the plurality of resource devices 130 may be interconnected by a network 140, for example, WANs (e.g., the Internet), LANs, etc., through various methods of communication, such as wired and/or wireless links. Those skilled in the art will understand that any number of computing resources, devices, links, etc. may be used in network 100, and that the view shown herein is for simplicity.

Data packets 150 (e.g., attribute information 170 and/or requests 180 and responses 185, as described below) may be exchanged among the nodes/devices of the computer network 100 using predefined network communication protocols as will be understood by those skilled in the art. In this context, a protocol consists of a set of rules defining how the nodes interact with each other.

Figure 2:
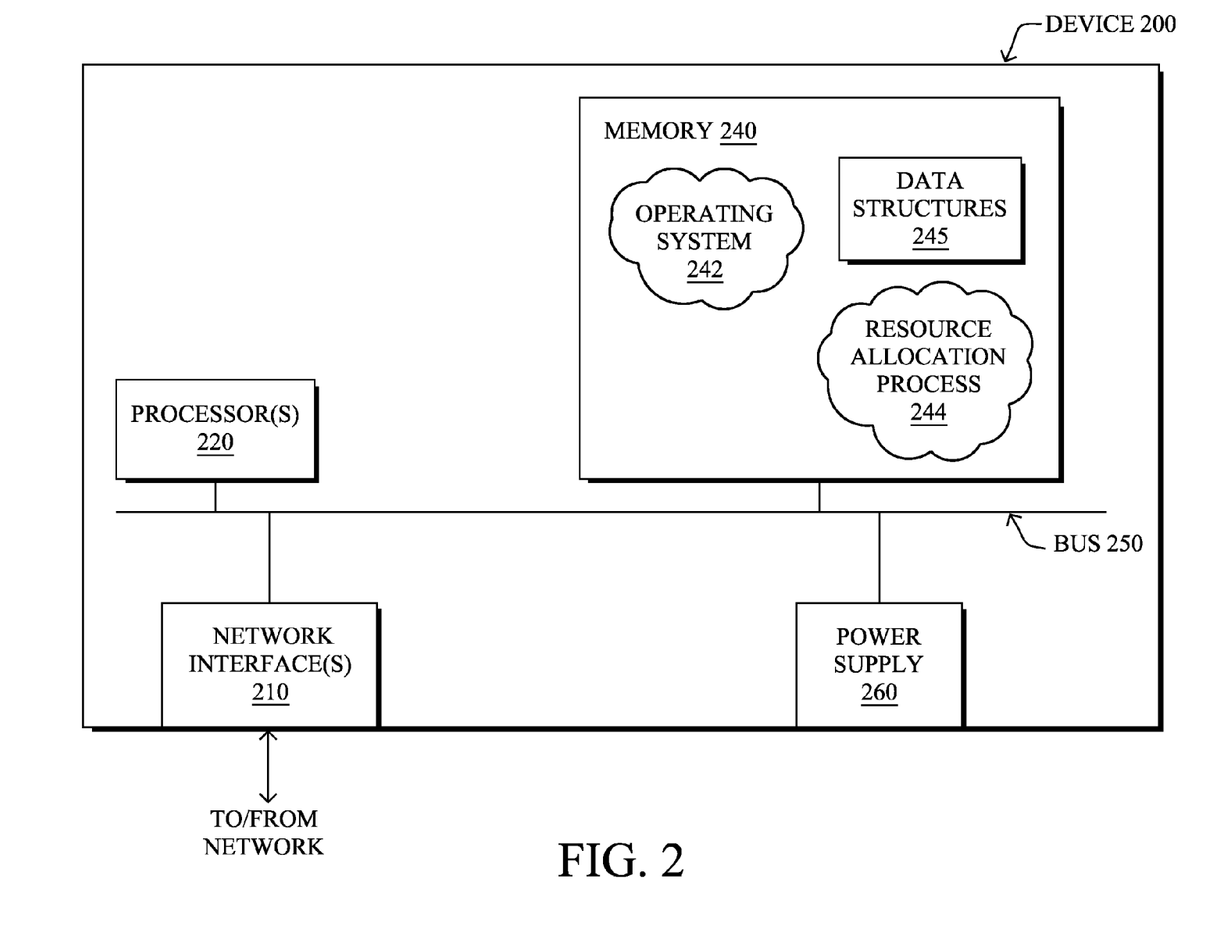
FIG. 2 illustrates an example network device/node.

FIG. 2 is a schematic block diagram of an example computing device 200 that may be used with one or more embodiments described herein, e.g., particularly as computing device 120 or in certain embodiments client device(s) 110 (e.g., for client-side operation of the techniques herein). The device 200 may comprise one or more network interfaces 210, at least one processor 220, and a memory 240 interconnected by a system bus 250. Network interface(s) 210 contain the mechanical, electrical, and signaling circuitry for communicating data over links coupled to network 100. The network interfaces 210 may be configured to transmit and/or receive data using a variety of different communication protocols, as will be understood by those skilled in the art.

The memory 240 comprises a plurality of storage locations that are addressable by processor 220 for storing software programs and data structures associated with the embodiments described herein. The processor 220 may comprise necessary elements or logic adapted to execute the software programs and manipulate data structures 245. Operating systems 242, portions of which are typically resident in memory 240 and executed by the processor, functionally organizes the device by, inter alia, invoking operations in support of software processes and/or services executing on the device. These software processes and/or services may comprise an illustrative "resource allocation" process/service 244, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having resource allocation process 244 encoded thereon. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

As noted above, cloud computing can be defined as Internet-based computing in which computing resources are dynamically provisioned and allocated to client or user computers or other devices on-demand from a collection of resources available via the network (e.g., "the cloud"). Cloud computing resources, for example, can include any type of resource such as computing, storage, and network devices, VMs, edge computing devices, etc. For instance, resources may include service devices (firewalls, deep packet inspectors, traffic monitors, etc.), processing devices (brute force processing capability), storage devices (e.g., servers, network attached storages, storage area network devices), etc.

Cloud computing, in particular, is envisioned as a way to allocate access to these resources according to particular needs of a user. However, as mentioned, allocating access to these resources presents various challenges. For example, there are an ever increasing number of computing resources within the cloud possessing an ever increasing variety of capabilities and attributes, and, further, there are an ever increasing number of users having various computing needs. Selecting particular resources for a given task is thus a complex problem. For multi-phase computing jobs executed in a cloud computing environment, these challenges are enhanced since the size of intermediate data sets between phases can vary.

A simple example of a multi-phase, distributed computing job is provided by the map-reduce framework. A map-reduce job has two phases of execution: a mapping phase and reducing phase. In each phase, one or more tasks are scheduled to run in parallel on different machines of the cloud computing environment. A job scheduler may be used to coordinate where and how the tasks in each phase are executed, to optimize the overall execution of the job. A specialized file system may also be used for query processing and temporary data storage (e.g., the Hadoop File System (HDFS) by the Apache Software Foundation, etc.). Such file systems are often deployed in large datacenters with powerful hardware, especially on bare metal under fast servers with high speed disks.

Some prior attempts to optimize the scheduling of map-reduce tasks have focused on equalizing the amount of resources allocated to the different tasks over time. Such "fair" schedulers operate to ensure that all tasks get an equal amount of computing resources over time. These approaches work relatively well for computation-intensive jobs, since the processing load is balanced across the resources. For I/O intensive jobs and jobs with high traffic between resources (e.g., passing data between tasks executed by different resources), however, these approaches are sub-optimal since they do not take into account available network resources or transfer times between processing nodes.

Other prior attempts to optimize the scheduling of map-reduce tasks have attempted to account for data transfer times by focusing on the relationships between the physical resource devices. For example, the Hadoop rack aware scheduler assigns tasks to resources using a hierarchy that is based on how the database racks executing the tasks are organized. For example, a rack aware scheduler may attempt to schedule a task for the next phase of processing at the same node that generated the data block to be processed in the previous phase. If this fails due to constraints on computing resources on the node, the scheduler will try to schedule the tasks on nodes within the same rack. If this fails, the scheduler will then pick a processing node on a different rack. The underlying assumption in this approach, however, is that the connections between nodes, disk speeds, etc., are the same for each node at a given level in the hierarchy. This assumption does not hold in many situations, such as edge computing scenarios in which processing nodes are at the edge of the network and have lower uplink bandwidths.

Thus far, existing map-reduce scheduling techniques fail to take into account network resources, such as the available bandwidth between processing nodes, when assigning resources to a task. Moreover, existing scheduling techniques fail to dynamically adjust for changes in the network topology and/or changes in the available network resources.

The techniques herein, on the other hand, enable a resource allocation process (e.g., a task scheduler) to schedule tasks of a multi-phase computing job using virtual clusters of computing resource nodes. The virtual clusters may be based on the actual network resources between the computing resource nodes, as opposed to arbitrary heuristic or homogenous network assumptions. In other words, the resource allocation process takes into account the actual network resources available when scheduling the transfer of intermediate data sets between different phases of the computing job.

Specifically, according to one or more embodiments of the disclosure as described in further detail below, information regarding a data set to be processed by a map-reduce process is received at a device. A set of virtual clusters for the map-reduce process is also generated based on network bandwidths between nodes of the virtual clusters, each node of the virtual cluster corresponding to a resource device. The data set is associated with a map-reduce process task. The execution of the task by a node of the virtual clusters is then scheduled based on the network bandwidth between the node and a source node on which the data set resides.

Illustratively, the techniques described herein may be performed by hardware, software, and/or firmware, such as in accordance with the resource allocation process 244, which may contain computer executable instructions executed by the processor 220 to perform functions relating to the techniques described herein.

Operationally, the resource allocation process 244, or, more generally, the device 200, e.g., computing device 120, first gathers information that represents the capability attributes or "resource properties" of resource devices within the network 100. This information may be represented, for example, by attribute information 170 sent from resource devices 130 in the network 100 and received by computing device 120, as depicted in FIG. 1. Notably, the information representing the capability attributes of devices in the data center may be received in real-time, i.e., as the capability attributes for a device changes, the device sends information representing the latest/updated capability attribute. A variety of techniques may employed for the reception of this attribute information 170 containing capability attributes of resources, such as publish-subscribe, polling/querying, etc.

For example, resources such as server resources, as well as the access switches, routers, firewall devices, load balancers, storage devices, etc. in the network (e.g., within one or more data centers), may send messages, e.g., attribute information 170, that contain an indication of their respective resource properties to the computing device 120. That is, each of these resources has a corresponding set of resource property values or attributes that are useful for purposes of management and provisioning service requests in a manner that is optimal to both the requestor, e.g., client device 110 (such as a customer), and a cloud service provider. As an example, these property values or capability attributes can include any one or more of the following: a central processing unit (CPU) count, a CPU speed, processor unit utilization, an available memory, hypervisor type, power consumption; amount of local storage availability, average load, a number of VM resources, number of load balancers, outgoing/downlink bandwidth, an incoming/uplink bandwidth, an average incoming delay, an average outgoing delay, a communication jitter metric, a longitude and latitude, etc. Notably, the set of particular attributes/properties discovered may vary over time, depending upon configuration and/or device capabilities.

Attribute information 170 may also include data regarding the status of tasks distributed to resource devices as part of a multi-phase computing job. In particular, attribute information 170 may include data indicative of the size of an intermediate data set generated during one of the phases of the overall computing job. For example, if the multi-phase computing job is a map-reduce process, attribute information 170 may include the number of key-value pairs generated by the mapping tasks distributed to the various resource devices in the network as part of the mapping phase of the job. In another example, attribute information 170 may include the amount of memory used to store an intermediate data set.

In one embodiment, attribute information 170 includes data regarding the network connecting the resource devices available to a multi-phase computing job. Such network resource data may include, for example, data regarding the network topology of the cloud computing environment (e.g., how the resource devices are interconnected) and the throughput capabilities of the network connections between the resource devices. For example, attribute information 170 may include information regarding the total possible connection bandwidth between two resource devices. Attribute information 170 may also include data regarding the available network bandwidth between two resource devices. The total possible bandwidth and available bandwidth between two resource devices may differ, for example, if other tasks outside of the computing job also pass data between the two resource devices.

Figure 3:
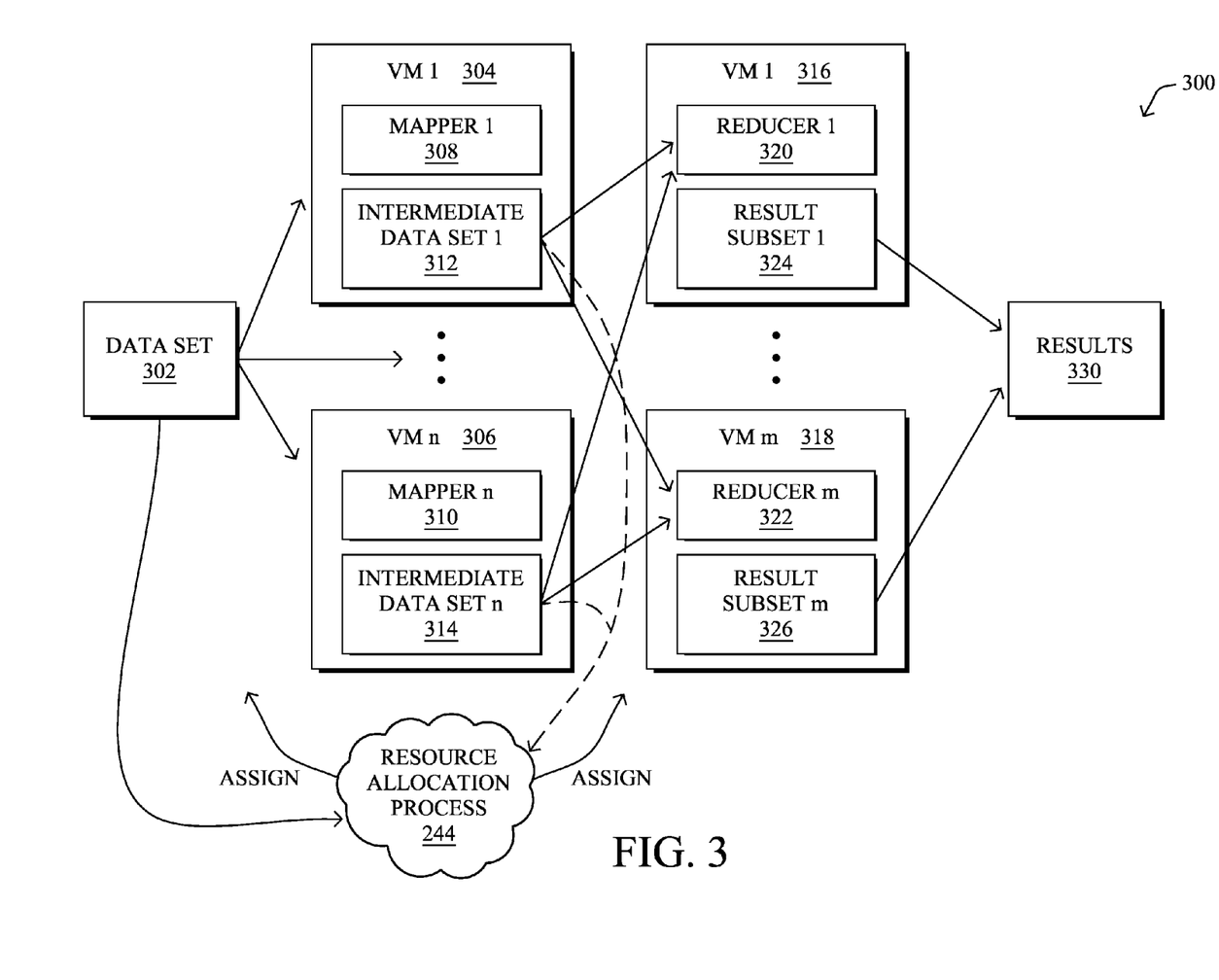
FIG. 3 illustrates an example multi-phase computing job.

Upon receiving the attribute information 170 from resource devices 130, the resource allocation process 244 of the central computing device 120 may then use this information to assign the tasks for the next phase of processing to other resource devices 130. For example, as shown in FIG. 3, resource allocation process 244 may receive data regarding the size of intermediate data sets generated in parallel by resource devices 130 in the cloud computing environment as part of a multi-phase, distributed computing job 300. For illustrative purposes only, resource allocation process 244 is shown to allocate resources as part of a map-reduce process, which includes a mapping phase and a reducing phase. However, those skilled in the art will appreciate that the functionality described herein may be used to allocate resources in any type of multi-phase, distributed computing job having any number of task phases.

According to the embodiments herein, resource allocation process 244 assigns tasks for each phase of computing job 300 to VMs executed by resource devices 130. Any number of VMs may be executed on a particular resource device, at any given time. For example, a particular resource device may execute multiple VMs that process data as part of computing job 300, different VMs assigned to different computing jobs, etc. The VMs executed by resource devices 130 may each have its own set of computing resource allocations, such as an allocated amount of physical memory and/or processing power. Thus, each VM may be treated by resource allocation process 244 as its own independent resource device, in some cases. In various embodiments, a VM may be preexisting on one of resource devices 130 at the time when resource allocation process 244 assigns a phase task to it or may cause the VM to be created as part of the task assignment. The VMs of resource devices 130 may be executed in bare metal environments (e.g., where the VM hypervisor runs directly on the hardware of the device) or within hosted environments (e.g., where the VM hypervisor runs within an operating system of the device on top of the hardware).

As shown, resource allocation process 244 receives data regarding an input data set 302 for processing by computing job 300. In response, resource allocation process 244 divides the data set 302 into any number of data subsets to be processed in parallel. For example, resource allocation process 244 may divide data set 302 into n-number of data subsets to be processed by n-number of mapper tasks (e.g., a first mapper task 308 through an nth mapper task 310) executed by n-number of VMs (e.g., a first VM 304 through an nth VM 306). In one embodiment, the maximum number of tasks/VMs available to computing job 300 at any given phase of computing job 300 may be limited. For example, the number of tasks in any given phase of computing job 300 may be limited by a user's configuration, a policy of the cloud computing environment, etc.

Mapper tasks 308-310 are configured to process the subdivided data set 302 into n-number of intermediate data sets 312-314 (e.g., a first intermediate data set 312 through an nth intermediate data set 314). As part of a map-reduce process, intermediate data sets 312-314 are key-value pairs generated by mapper tasks 308-310 from the subdivided input data set 302. For example, assume that data set 302 includes a listing of baseball teams and the number of wins each team had per year. Also, assume that computing job 300 is used to identify the maximum number of wins each team had for any given year (e.g., the best season of each team). In such a case, mapper tasks 308-310 may use the names of the teams as key values and the wins per year as values associated with the name keys. Thus, intermediate data set 312 may include a number of key-value pairs that associate a given baseball team with values that correspond to the number of wins by that team in a given year.

As part of the next phase of computing job 300, m-number of reducer tasks 320- (e.g., a first reducer task 320 through an mth reducer task 322) process intermediate data sets 312-314 to generate m-number of result subsets 324-326 (e.g., a first result subset 324 through an mth result subset 326). For example, if intermediate data sets 312-314 are of the following format: <team 1><#wins in year 1>, <team 1><#wins in year 2>, etc., reducer processes 320-322 may search through the key-value pairs to identify the greatest number of wins per team. In other words, result subsets 324-326 include only the key-value pairs that correspond to each team's maximum number of wins for any year. Result subsets 324-326 are then combined to form the final results 330. For example, final results 330 may include a listing of each baseball team, followed by the number of wins each team had in its best season.

In various embodiments, resource allocation process 244 receives data indicative of the sizes of intermediate data sets 312-314 from VMs 304-306 and uses this information to allocate reducer tasks 320-322 to VMs 316-318. For example, resource allocation process 244 may receive data indicative of the number of bytes occupied by each of intermediate data sets 312-314, the number of key-value pairs in each of intermediate data sets 312, 314, or the like. Resource allocation process 244 may use the size information to identify which of VMs 316-318 are appropriate to execute reducer tasks 320-322. For example, assume that intermediate data set 312 is twice as large as intermediate data set 314. In such a case, resource allocation process 244 may allocate reducer task 322 to process intermediate data set 312 and reducer task 320 to process intermediate data set 314, if VM 318 has double the computational resources as that of VM 316. In further embodiments, resource allocation process 244 may base the assignment of intermediate data sets 312-314 to reducer tasks 320-322 based on the network bandwidth between VMs 304-306 and VMs 316-318. For example, if intermediate data set 314 is the largest intermediate data set, it may be assigned to reducer task 320 if the network connection between VM 306 and VM 316 has the highest bandwidth and VM 316 has the computational resources to process intermediate data set 314.

Figure 4:
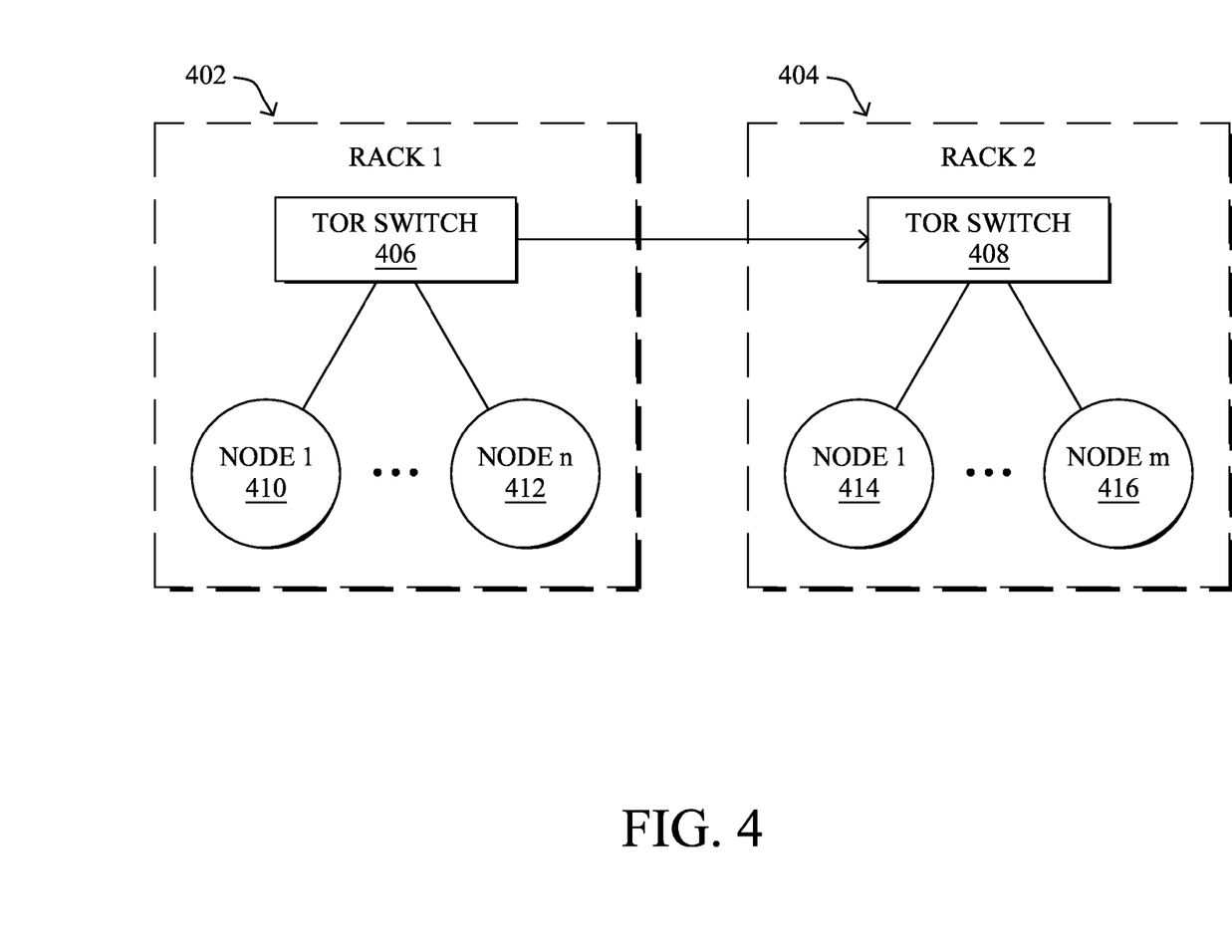
FIG. 4 illustrates example computing racks having computing resources.

As noted previously, VMs 304-306 and 316-318 may each be executed within computing resource nodes which correspond to the physical hardware of resource devices 130. Thus, a relationship between the VMs/computing resource nodes may be determined based on the hardware relationships between resource devices 130. For example, FIG. 4 illustrates example computing racks 402-404 subdivided into a plurality of computing resource nodes. For illustrative purposes only, the relationships between computing resource nodes on two racks are shown. However, those skilled in the art will appreciate that a cloud computing environment may include any number of mainframe racks located at the same or different physical locations.

According to embodiments herein, rack 402 may be represented as a plurality of computing resource nodes 410-412 (e.g., a first computing resource node through an nth computing resource node). Similarly, rack 404 may be represented as a plurality of computing resource nodes 414-416 (e.g., a first computing resource node through an mth computing resource node). Racks 402, 404 may or may not have the same number of associated computing resource nodes, in various embodiments. Each of computing resource nodes 410-412 and 414-416 has an associated amount of computing resources available to it. For example, computing resource node 410 may have an associated amount of processing power and/or allotted memory space in rack 402. In various embodiments, resource nodes 410-412 and 414-416 are hardware-based computing devices within each rack, such as blade servers, in which the corresponding VMs are executed.

As shown, racks 402, 404 are physically networked via top of rack (TOR) switches 406, 408, respectively. Thus, data may be transferred between racks 402, 404 via TOR switches 406, 408. Any number of networking devices may exist between TOR switches 406, 408, such as aggregation switches, fiber optic cabling, etc., to facilitate the exchange of data between racks 402, 404.

In one embodiment, a hierarchy may be generated to represent the relationships between computing nodes 410-412 and 414-416. For example, each computing node within a given rack may be represented on the same level of the hierarchy (e.g., each of computing resource nodes 410-412 may be located on the same level of the hierarchy). Above the node levels in the hierarchy are the TOR switches 406, 408. In other words, computing resource nodes 410-412 may be represented as one branch of the hierarchy under TOR switch 406 and computing resource nodes 414-416 may be represented as another branch of the hierarchy under TOR switch 408.

A map-reduce task scheduler may naively use the depicted hierarchy of computing nodes 410-412, 414-416 to assign tasks to VMs. For example, assume that VM 304 shown in FIG. 3 is run on computing resource node 410. In such a case, mapper task 308 executed within VM 304 generates intermediate data set 312, which is stored within the memory of computing resource node 410. Under a naïve approach, resource allocation process 244 may first attempt to assign reducer task in the next phase of processing to computing resource node 410. If computing resource node 410 does not have sufficient computing resources available, resource allocation process 244 may then attempt to assign the reducer task to computing resource node 412, since nodes 410 and 412 are on the same rack 402. If no computing resource nodes have sufficient resources to process the reducer task, resource allocation process 244 may then attempt to schedule the reducer task on a computing resource node on a different rack (e.g., on computing resource node 414 on rack 404. Such an approach, however, naively assumes that each of the computing resource nodes within a given rack share the same bandwidth. Similarly, the network bandwidth between computing resource nodes on different nodes is also assumed to be constant.

Figure 5:
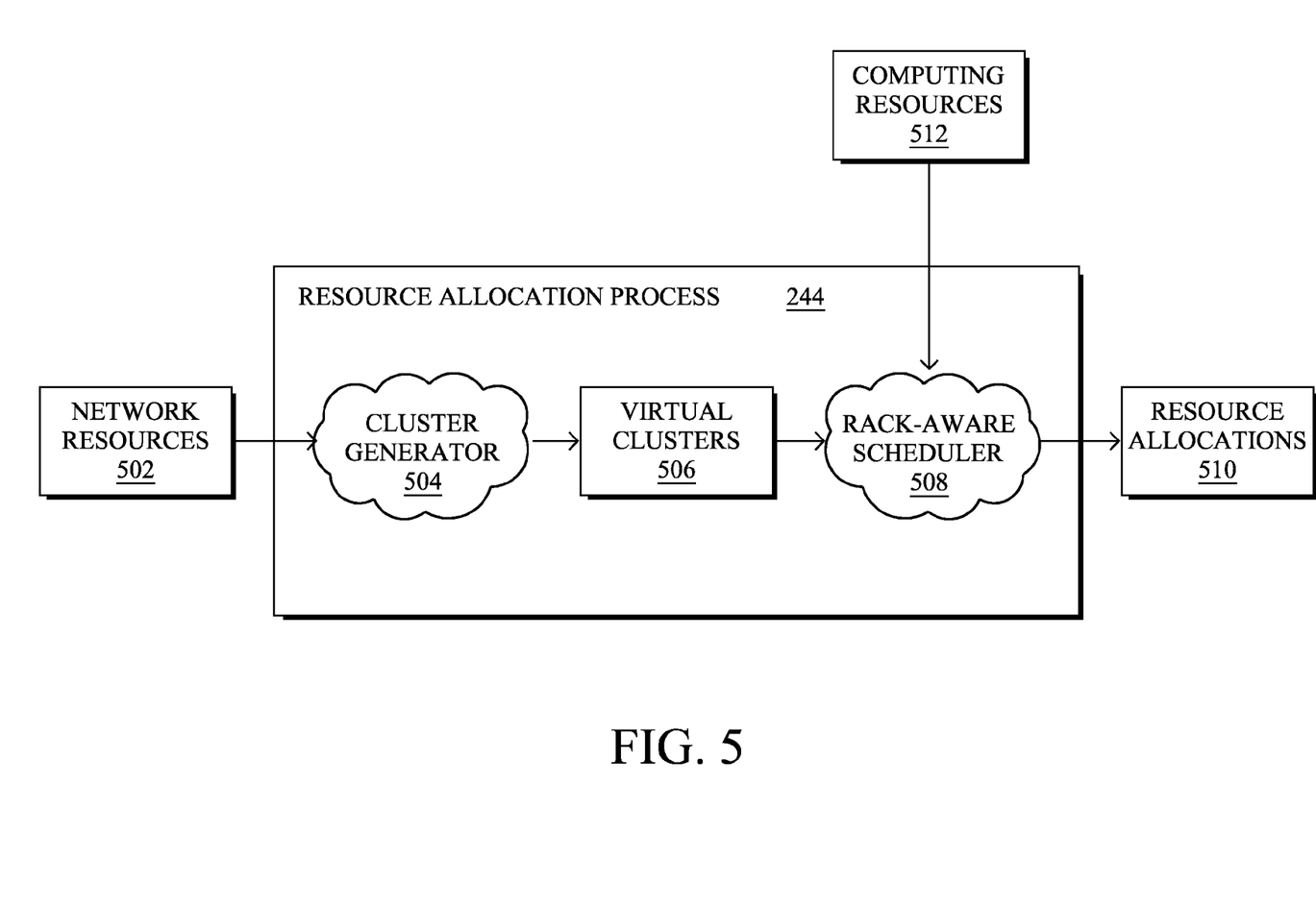
FIG. 5 illustrates an example resource allocation process.

Referring now to FIG. 5, resource allocation process 244 receives network data 502 and uses network data 502 to organize computing resource nodes into virtual clusters, according to one embodiment. As shown, resource allocation process 244 may receive various data regarding the available computing resources 512 and network resources 502 of the cloud computing environment (e.g., as part of attribute information 170 received by computing device 120). Based on network resources 502 and computing resources 512, resource allocation process 244 generates resource allocations 510 and provides instructions to the corresponding resource devices regarding the allocations. In other words, resource allocations 510 may indicate the assignment of map-reduce tasks to resource devices. For example, resource allocations 510 may include an instruction sent by resource allocation process 244 to a particular resource device to spawn a VM/map-reduce task at a particular computing resource node, to process a data set from the previous phase of the computing job.

In one embodiment, resource allocation process 244 includes a traditional, rack-aware scheduler 508 that assigns tasks to VMs within a map-reduce framework. Rack-aware scheduler 508 may be configured, in some cases, to base map reduce task assignments on the available computing resources at each resource device and on a naïve relationship between the resource devices. For example, rack-aware scheduler 508 may coordinate the assignment of tasks to resource devices based in part on computing resources 512 received by resource allocation process 244. Computing resources 512 may include data such as the amount of memory available at a particular computing resource node and/or device, the amount of processing resources available at the computing resource node and/or device (e.g., the instructions per second available by the resource's processor, a measure of the processor's clock speed, etc.), or the like. In some embodiments, rack-aware scheduler 508 may also utilize the hierarchy of computing resource nodes depicted in FIG. 4 to assign tasks to VMs for different phases of the map-reduce computing job (e.g., by attempting to first assign a task to the same node, then to a node on the same rack, etc.).

According to various embodiments, resource allocation process 244 also includes a cluster generator 504 configured to generate virtual clusters 506 based on the network resources 502 received by resource allocation process 244. In general, network resources 502 include information regarding the available bandwidths between computing resource nodes associated with resource devices 130. Bandwidth between networked devices may be dynamically measured using probes, obtained from a network aware scheduler if a software defined networking (SDN) layer is used, or using any other bandwidth detection mechanism. In one embodiment, network resources 502 also include information regarding the topology of the network. The data in network resources 502 may be generated using a device discovery protocol in which the devices on the network provide information regarding their identities, capacities (e.g., available bandwidth, total bandwidth, etc.), and neighboring devices. For example, network resources 502 may be generated in part using the link layer discovery protocol (LLDP) or another such network device discovery protocol.

Cluster generator 504 may represent the topology indicated in network resources 502 as a graph G(V,E) in which the vertices V represents individual computing resource nodes in the network and the edges E between the vertices represents the network connections between the computing resource nodes. In one embodiment, cluster generator 504 weights the edges E of the graph based on the available bandwidth between the respective resource nodes indicated in received network resources 502. For example, the graph edges may be weighted by cluster generator 504 using the named throughputs supported by the resource devices/computing resource nodes (e.g., 1 Gbps, 10 Gbps, etc.). In some cases, cluster generator 504 may adjust the edge weights to account for network allocations to other processes. For example, cluster generator 504 may subtract these bandwidths from the named throughputs and use the resulting bandwidths as edge weights, to account for non-map-reduce workloads and other processes running on the same resource devices and consuming a portion of the network resources. Cluster generator 504 then uses a clustering technique on the graph to group the graph vertices into interconnected clusters.

In one embodiment, cluster generator 504 generates virtual clusters 506 using a clustering technique such that the inter-cluster available bandwidth in virtual clusters 506 is much lower than the intra-cluster available bandwidth. For example, cluster generator 504 may use a k-cut methodology to generate a set of clusters (e.g., clusters $C_1$ to $C_k$) in virtual clusters 506 that each has a lower inter-cluster bandwidth than an intra-cluster bandwidth. The membership of each graph vertex/computing resource node in each cluster may be automatically configured by resource allocation process 244, using such an approach. In another embodiment, virtual clusters 506 may be manually configured by a user based on the computation results of cluster generator 504 (e.g., a user may override certain cluster assignments, may alter the constraints used by cluster generator 504 to generate the clusters, etc.). As will be appreciated by one skilled in the art, other clustering techniques may also be used, such as nearest neighbor clustering, clustering techniques that impose a limit on the number of clusters, or the like. In further embodiments, cluster generator 504 may attempt to optimize the transfer of data sets between computing resource nodes for inter-cluster communication using compression and using techniques from network coding.

Virtual clusters 506 may be updated by cluster generator 504 at any time. For example, virtual clusters 506 may be updated as a periodic job (e.g., nightly, weekly, etc.) or in response to a detected change in the bandwidth between computing resource nodes. In one embodiment, virtual clusters 506 are regenerated by cluster generator 504 in response to receiving a network topology change notification. In such a case, cluster generator 504 determines the bandwidths between the resource devices in the changed topology and generates a new set of virtual clusters 506 based on the bandwidths in the changed network topology.

In one embodiment, virtual clusters 506 are treated by rack-aware scheduler 508 as virtual mainframe racks. For example, each rack, used by rack-aware scheduler 508 to schedule the execution of tasks may be mapped to a corresponding virtual cluster C, in virtual clusters 506. In other words, the techniques described herein may be used with a rack-aware scheduler that uses a rack-based hierarchy of resources to allocate computing resources to map-reduce tasks. In other embodiments, rack-aware scheduler 508 may be combined with cluster generator 504 and process the virtual clusters directly (i.e., without treating each cluster as an actual rack).

Figure 6:
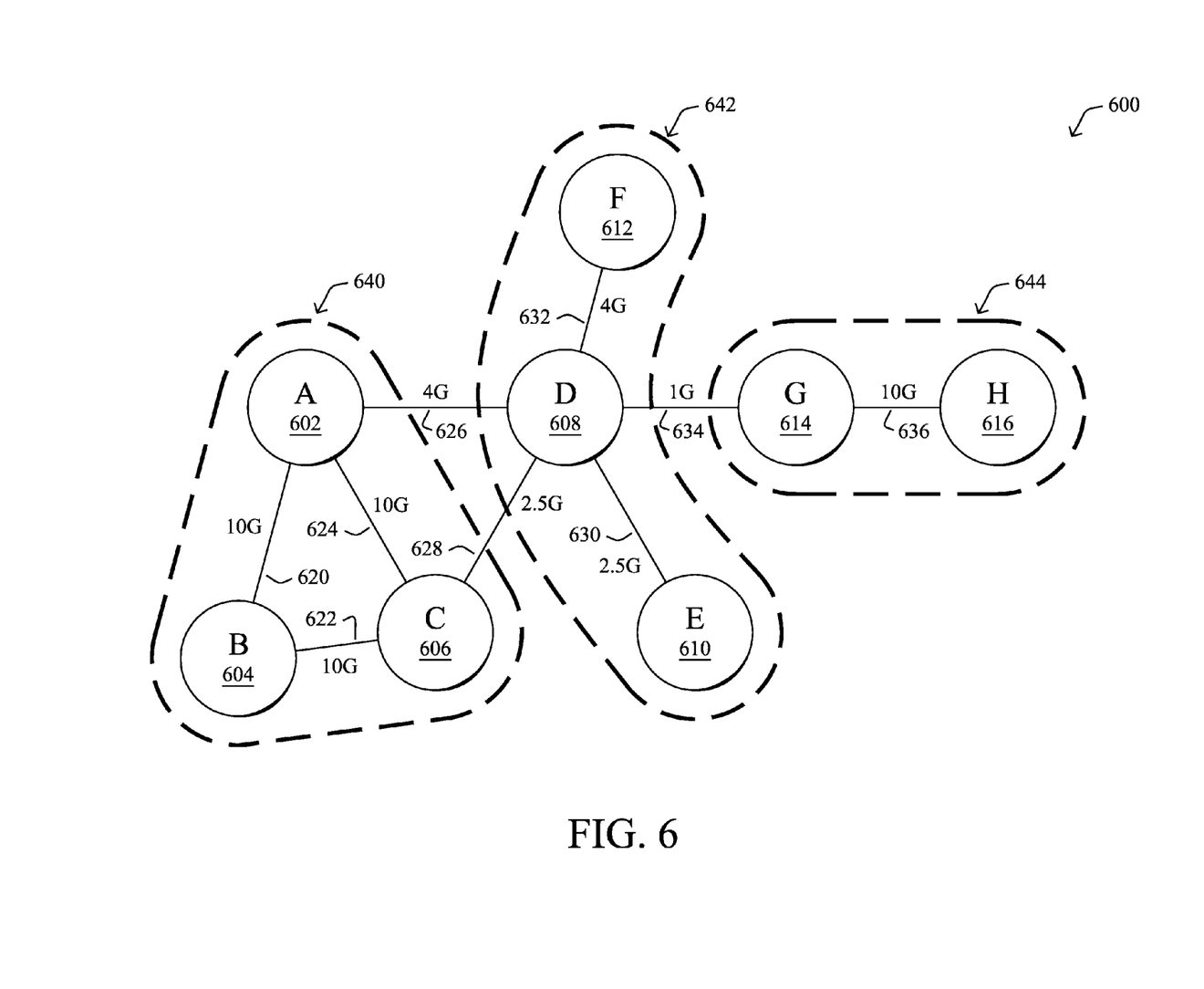
FIG. 6 illustrates example virtual clusters of computing resources.

FIG. 6 illustrates one example of virtual clusters of computing resource nodes that may be generated by cluster generator 504, in one embodiment. As shown, cluster generator 504 may generate a map 600 having vertices 602-616 that correspond to individual computing resource nodes in a cloud computing environment. Each of vertices 602-616 are connected to one or more other vertices in map 600 via edges 620-636 that correspond to network paths over which data can be transferred between computing resource nodes. For example, a computing resource node represented by vertex 602 may share a network connection (e.g., within a given rack, between racks, etc.) with another computing resource node represented by vertex 606. Edges 620-636 of map 600 are formed based on the network topology connecting the computing resource nodes. In some embodiments, edges 620-636 are weighted using the total or available bandwidths along each of the network connections. For example, edge 634 may be weighted based on vertices 608 and 610 sharing a network connection that has an available bandwidth of 1 Gigabyte per second.

A clustering technique is used on vertices 602-616 to form virtual clusters 640-644. For example, virtual cluster 640 is shown to include vertices 602-606, 642 is shown to include vertices 608-612, and virtual cluster 644 is shown to include vertices 614-616. In one embodiment, the clustering technique may form virtual clusters 640-644 such that the inter-cluster edge weights between clusters 640-644 are much lower than the edge weights within each cluster. In other words, the membership of vertices in each of the clusters may be determined such that data can be transferred faster within a given cluster than between different clusters. For example, edge 634 that connects virtual clusters 642 and 644 has a weighting that corresponds to an available bandwidth of 1 Gigabyte over the network connection that connects the two clusters. In contrast, vertices 614 and 616 within virtual cluster 644 share a network connection having a much higher available bandwidth of 10 Gigabytes per second, as indicated by the weighting of edge 636.

A map-reduce task scheduler, such as resource allocation process 244, may use virtual clusters 640-644 to assign a task to a VM running on a particular computing resource node. In particular, resource allocation process 244 may assess the current location of the data set as it relates to the other nodes in virtual clusters, to assign a node in one of the clusters to process the data set. For example, if the data set generated in the prior phase of the job is located on the computing resource corresponding to vertex 614, the scheduler may first attempt to assign the task for the next phase of the job to the same computing resource node (i.e., also to vertex 614). If insufficient computing resources are available at vertex 614, the scheduler may then attempt to schedule the task for the next phase at the computing resource node corresponding to vertex 616, since vertices 614 and 616 belong to the same virtual cluster 644. If vertex 616 also lacks the necessary computing resources to execute the task, the scheduler may then look to vertices in other clusters, such as virtual cluster 642. Thus, resources may be allocated by the scheduler such that the transfer of data sets between phases of processing is optimized.

Figure 7:
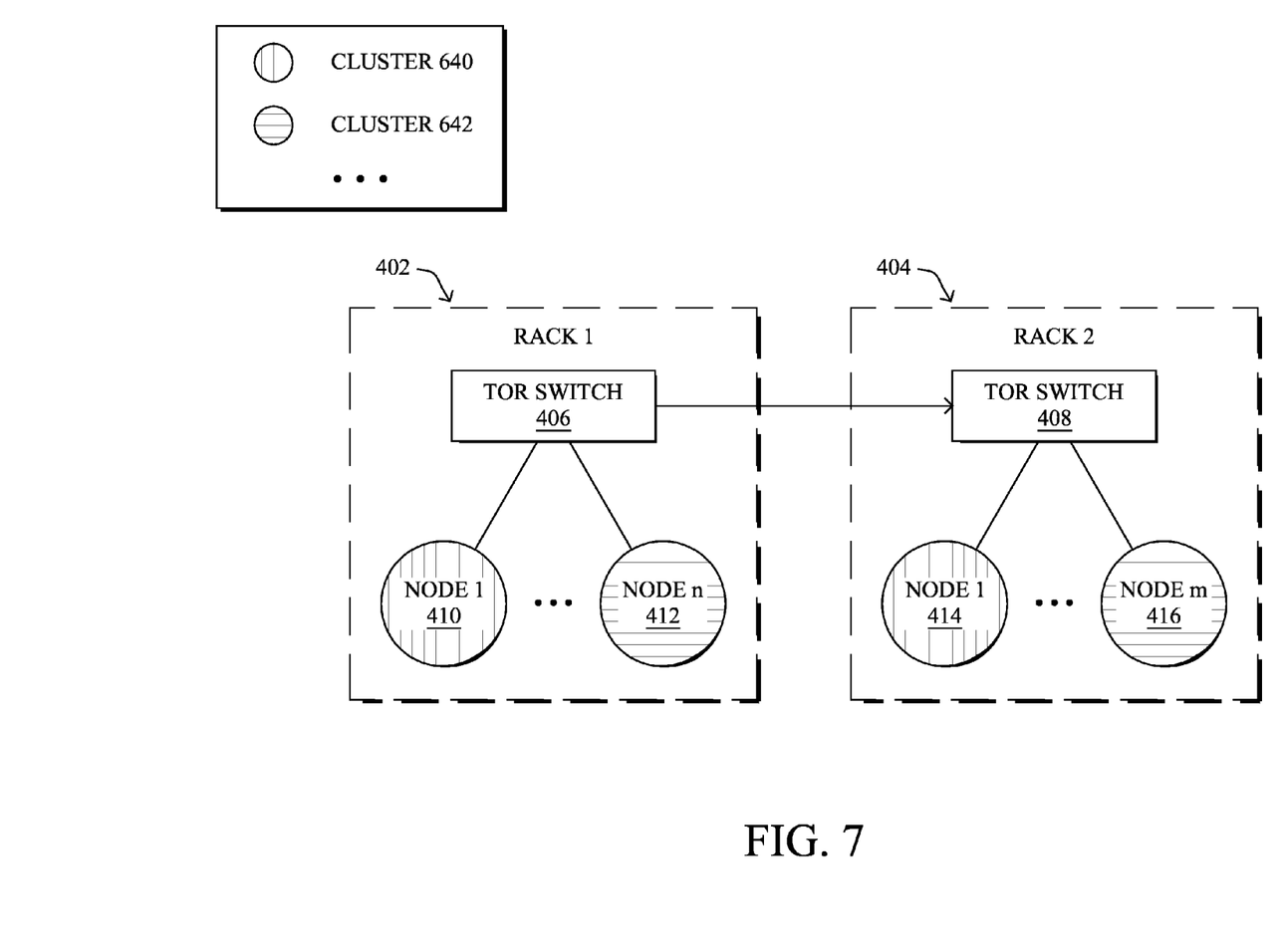
FIG. 7 illustrates the clusters of FIG. 6 implemented within the computing racks of FIG. 4.

Since clusters 640-644 are generated based on the available network resources between the computing resource nodes, the physical proximity of the computing resource nodes is effectively disregarded (i.e., clusters 640-644 are "virtual" clusters of computing resource nodes). FIG. 7 illustrates one example of the virtual clusters 640-644 implemented within the computing racks 402-404 of FIG. 4, according to one embodiment. As shown, computing resource node 410 on rack 402 and computing resource nodes 414, 416 on rack 404 may belong to the same virtual cluster 640. Similarly, computing resource node 412 on rack 402 may belong to virtual cluster 642. Thus, computing resource nodes 410 and 414 belong to different virtual clusters, i.e., virtual clusters 640, 642, respectively, despite being physically located on the same rack 402. In other words, the network bandwidths to/from nodes 410 and 412 may be such that computing resource node 410 is able to transfer data faster to or from nodes 414 and 416 on rack 404 than with node 412.

Resource allocation process 244 uses the assignments of computing resource nodes 410-416 to virtual clusters 640-644, to schedule and assign the map-reduce tasks to computing resource nodes 410-416. For example, assume that a mapper task is executed in a VM on computing resource node 410. In such a case, resource allocation process 244 may attempt to place the reducer task that receives the output data set from the mapper task also on computing resource node 410. If insufficient computing resources are available on node 410, resource allocation process 244 may then attempt to assign the reducer task to either of nodes 414 or 416, depending on which of the two node has the highest shared bandwidth with resource node 410.

Figure 8:
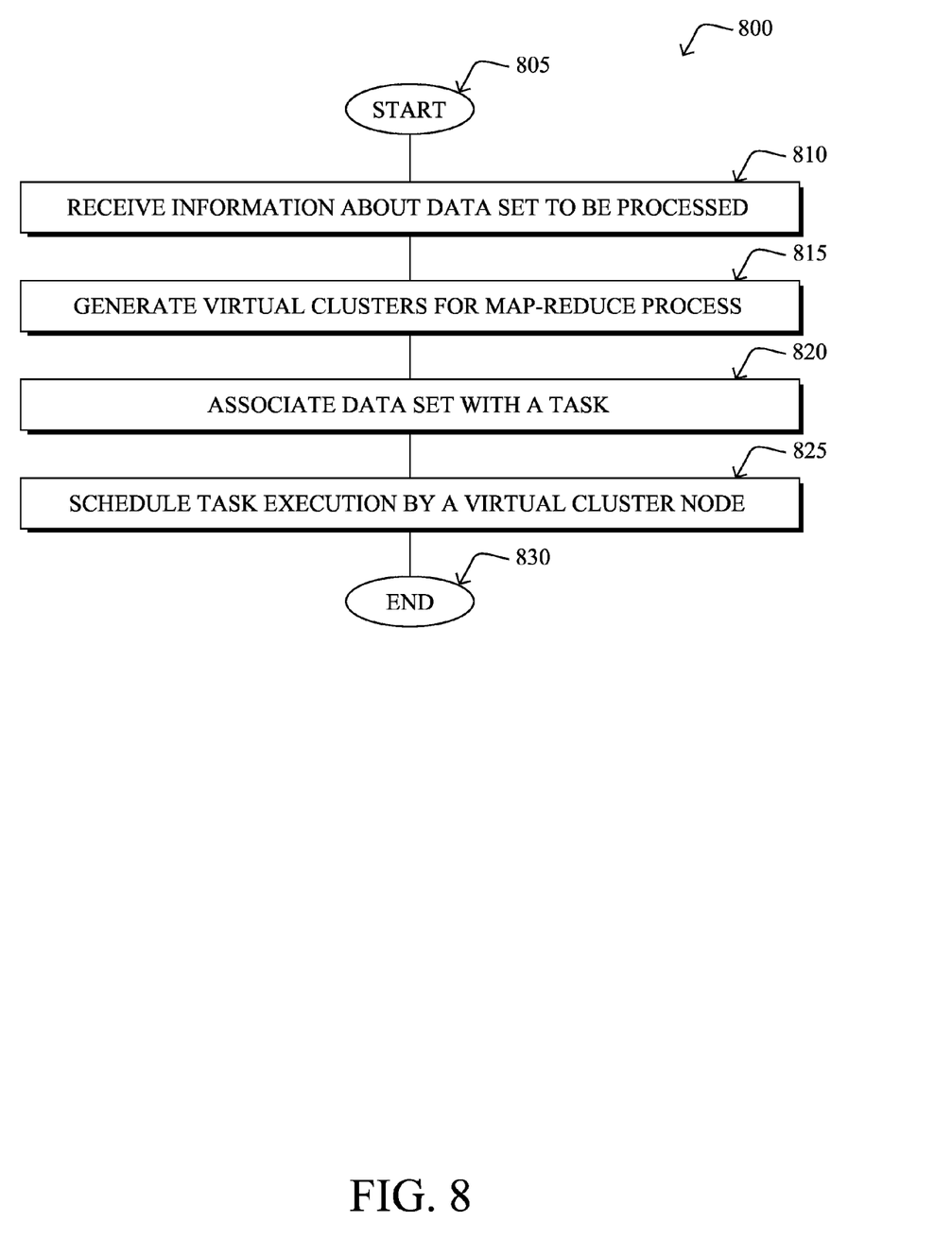
FIG. 8 illustrates an example simplified procedure for scheduling tasks using virtual clusters of computing resources.

FIG. 8 illustrates an example simplified procedure 800 for scheduling task executions in a map-reduce computing job using virtual clusters, in accordance with one or more embodiments described herein. The procedure 800 starts at step 805, and continue to step 810, where, as described in greater detail above, information regarding a data set to be processed by a map-reduce process is received. Such information may include, for example, information regarding the size of the data set, the current location of the data set (e.g., on which VM(s)/computing resource(s) the data set currently resides), or other such information. In various embodiments, the received information may be about an initial data set to be processed by a map-reduce computing job or an intermediate data set generated during a phase of the job (e.g., the intermediate data set may be a singular data set generated by one mapper task or a combined data set generated by multiple mapper tasks).

A set of virtual clusters for the map-reduce process are generated in step 815 to represent a relationship between computing resource nodes available for allocation to a map-reduce task. In various embodiments, the clusters are generated based in part on the bandwidths between the computing resource devices/nodes that are eligible to process a map-reduce task. The generated clusters are "virtual" in that the computing resource nodes within a generated cluster may be associated with different racks or other computing devices. In other words, the virtual clusters are agnostic to the physical relationships between the resource devices and are based instead on the networking resources available between the computing resources.

At step 820, the data set is associated with a map-reduce process task. For example, at least a portion of an input data set may be associated with a mapper task of the map-reduce process. In another example, an intermediate data set (e.g., a data set generated by a mapper task) may be associated with a reducer task that will process the intermediate data set.

At step 825, the task is scheduled for execution by one of the nodes of the virtual cluster (e.g., by the corresponding resource node/device). In various embodiments, the node is selected to execute the task based on the network bandwidth between the node and the node at which the data set currently resides. For example, a mapper task may be scheduled on a computing resource node based on the network bandwidth between the resource node and the node on which at least a portion of the input data set resides. In another example, a VM may be spawned on a resource node to execute a reducer task based on the bandwidth between the node and the node at which an intermediate data set resides. Procedure 800 then ends at step 830 or may be repeated any number of times across different phases of a multi-phase, distributed computing process.

Figure 9:
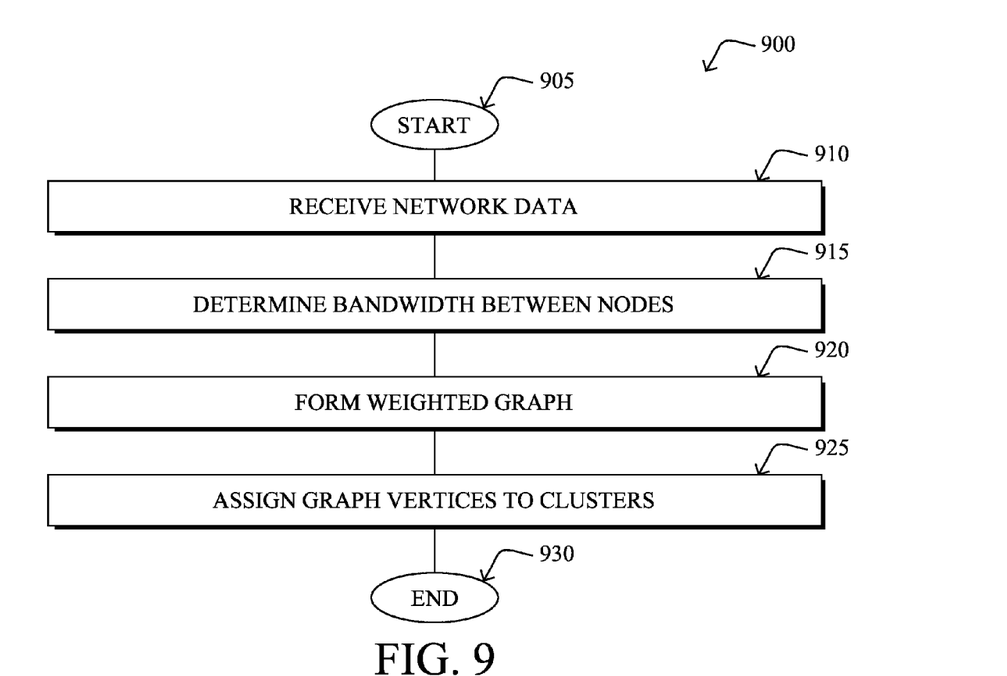
FIG. 9 illustrates an example simplified procedure for generating virtual clusters of computing resources.

FIG. 9 illustrates an example simplified procedure 900 for generating virtual clusters of computing resources for a map-reduce process, in accordance with one or more embodiments described herein. The procedure 900 begins at step 905, and continues to step 910, where, as described in greater detail above, network data is received. The network data may include information regarding the network topology (e.g., how the networked devices are interconnected) and/or the network resources associated with the devices on the network. For example, the received data may include information regarding the total or available bandwidths between the networked devices.

At step 915 the available bandwidths between computing resource nodes in the network are determined. For example, bandwidths between two mainframe racks or two blade servers may be determined using the received network data. In various cases, the bandwidth information may be based on the named throughput of the computing resource devices, the available bandwidth between the devices (e.g., by subtracting out any bandwidth used by other processes), or the like.

At step 920, a weighted graph is generated using the network topology for the computing resource devices. Each vertex of the graph may represent a different computing resource and each edge of the graph may represent a network connection between computing resources. The edges may be weighted based on the bandwidth that exists between the computing resources, such as the actual or named bandwidths between the devices.

At step 925, the vertices of the graph are assigned to virtual clusters based on the weights of the graph edges between the vertices. In one embodiment, the virtual clusters are formed such that the inter-cluster bandwidths are much lower than the intra-cluster bandwidths. In further embodiments, other clustering techniques may be used to limit the total number of clusters, ensure that a particular cluster has as given inter- or intra-cluster bandwidth, or satisfy any number of other constraints. Procedure 900 then ends at step 930 or may be repeated, such as when a network topology change notification is received.

Figure 10:
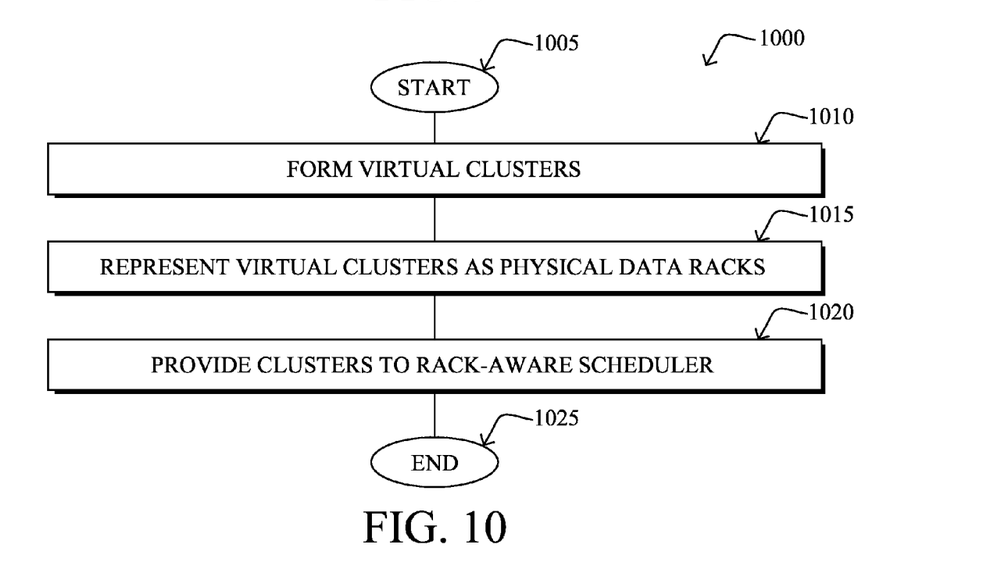
FIG. 10 illustrates an example simplified procedure for using virtual clusters within a rack aware scheduler.

FIG. 10 illustrates an example simplified procedure 1000 for using virtual clusters within a rack aware scheduler, in accordance with one or more embodiments described herein. The procedure 1000 begins at step 1005, and proceeds to step 1010 in which virtual clusters are formed. The virtual clusters may include computing resource nodes that correspond to computing resource devices, such as racks, servers, etc. In various embodiments, the virtual clusters may be formed, in accordance with procedure 900 shown in FIG. 9.

At step 1015, each virtual cluster formed in step 1010 may be represented as a physical data rack in the computing environment. For example, a virtual cluster $C_i$ containing computing resource nodes located on different racks may be represented as a particular $rack_i$. Procedure 1000 then continues on to step 1020 in which the virtual clusters are provided to a rack-aware scheduler process. In various embodiments, the rack-aware scheduler process is configured to apply a naïve scheduling methodology to schedule tasks (e.g., based simply on the physical relationships of computing resource nodes and mainframe racks). In such cases, the rack-aware scheduler may be "tricked" into using the virtual clusters in lieu of the physical racks, to make task scheduling decisions. Process 1000 then ends at step 1025.

It should be noted that while certain steps within procedures 800-1000 may be optional as described above, the steps shown in FIGS. 8-10 are merely examples for illustration and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a principled approach that is based on unsupervised learning of the underlying network to tune a map-reduce scheduler. The approach is not based on arbitrary heuristic or homogeneous network resource assumptions, but instead is based on the throughputs between computing resources. The approach can also work in constrained networks and does not force any action on behalf of switches and routers. Thus the techniques described herein can be deployed in brownfield networks, in some embodiments.

While there have been shown and described illustrative embodiments that provide for allocating resources to process data sets in a multi-phase process, it is to be understood that various other adaptations and modifications may be made within the spirit and scope of the embodiments herein. For example, the embodiments herein have been shown and described primarily with respect to a MapReduce process. However, the embodiments in their broader sense are not as limited, and may, in fact, be used with other types of distributed computing processes that perform tasks in multiple phases. The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    receiving, at a device, information regarding a data set to be processed by a map-reduce process, wherein the map-reduce process comprises a rack-aware scheduler;
    generating a set of virtual clusters for the map-reduce process based on network bandwidths between nodes of the virtual clusters, each node of a virtual cluster corresponding to a resource device, wherein the set of virtual clusters are generated such that intra-cluster bandwidths in the set are greater than inter-cluster bandwidths in the set;
    associating the data set with a map-reduce process task; and
    scheduling, by the rack-aware scheduler, the execution of the task by a node of the virtual clusters based on the network bandwidth between the node and a source node on which the data set resides, wherein the virtual clusters are used by the rack-aware scheduler in lieu of a physical rack to make scheduling decisions.

2. The method as in claim 1, wherein the bandwidth between two nodes of the virtual clusters corresponds to a maximum possible bandwidth between the two nodes.

3. The method as in claim 1, wherein the bandwidth between two nodes of the virtual clusters corresponds to an available bandwidth calculated by subtracting the bandwidth used by other processes on the two nodes from the maximum possible bandwidth between the two nodes.

4. The method as in claim 1, further comprising:
receiving a network topology change notification;
determining bandwidths between resource devices in the changed network topology; and
generating a new set of virtual clusters based on the bandwidths in the changed network topology.

5. The method as in claim 1, further comprising:
compressing data transferred between nodes of different virtual clusters.

6. The method as in claim 1, further comprising:
receiving network data that comprises a network topology;
determining bandwidths between computing resource nodes in the network topology;
forming a weighted graph using the computing resource nodes as vertices of the graph, wherein edges in the graph between vertices represent network connections between the resource nodes that are weighted using the bandwidth between the resource nodes;
assigning the graph vertices to the virtual clusters.

7. The method as in claim 1, wherein the virtual clusters are treated as virtual mainframe racks by the rack-aware scheduler.

8. An apparatus comprising:
one or more network interfaces configured to communicate in a computer network;
a processor configured to execute one or more processes; and
a memory configured to store a process executable by the processor, the process when executed operable to:
receive information regarding a data set to be processed by a map-reduce process, wherein the map-reduce process comprises a rack-aware scheduler;
generate a set of virtual clusters for the map-reduce process based on network bandwidths between nodes of the virtual clusters, each node of a virtual cluster corresponding to a resource device, wherein the set of virtual clusters are generated such that intra-cluster bandwidths in the set are greater than inter-cluster bandwidths in the set;
associating the data set with a map-reduce process task; and
scheduling, by the rack-aware scheduler, the execution of the task by a node of the virtual clusters based on the network bandwidth between the node and a source node on which the data set resides, wherein the virtual clusters are used by the rack-aware scheduler in lieu of a physical rack to make scheduling decisions.

9. The apparatus as in claim 8, wherein the bandwidth between two nodes of the virtual clusters corresponds to a maximum possible bandwidth between the two nodes.

10. The apparatus as in claim 8, wherein the bandwidth between two nodes of the virtual clusters corresponds to an available bandwidth calculated by subtracting the bandwidth used by other processes on the two nodes from the maximum possible bandwidth between the two nodes.

11. The apparatus as in claim 8, wherein the process is operable to:
receive a network topology change notification;
determine bandwidths between resource devices in the changed network topology; and
generate a new set of virtual clusters based on the bandwidths in the changed network topology.

12. The apparatus as in claim 8, wherein the process is operable to:
compress data transferred between nodes of different virtual clusters.

13. The apparatus as in claim 8, wherein the task comprises a reducer task.

14. The apparatus as in claim 8, wherein the virtual clusters are treated as virtual mainframe racks by the rack-aware scheduler.

15. A tangible, non-transitory, computer-readable media having software encoded thereon, the software, when executed by a processor, operable to:
receive information regarding a data set to be processed by a map-reduce process, wherein the map-reduce process comprises a rack-aware scheduler;
generate a set of virtual clusters for the map-reduce process based on network bandwidths between nodes of the virtual clusters, each node of a virtual cluster corresponding to a resource device, wherein the set of virtual clusters are generated such that intra-cluster bandwidths in the set are greater than inter-cluster bandwidths in the set;
associate the data set with a map-reduce process task; and
schedule, via the rack-aware scheduler, the execution of the task by a node of the virtual clusters based on the network bandwidth between the node and a source node on which the data set resides, wherein the virtual clusters are used by the rack-aware scheduler in lieu of a physical rack to make scheduling decisions.

16. The computer-readable media as in claim 15, wherein the software, when executed by the processor, is operable to:
receive a network topology change notification;
determine bandwidths between resource devices in the changed network topology; and
generate a new set of virtual clusters based on the bandwidths in the changed network topology.

* * * * *